United States Patent

[11] 3,559,676

| [72] | Inventor | Lauren D. Haskins |
| | | Long Beach, Calif. |
| [21] | Appl. No. | 840,235 |
| [22] | Filed | July 9, 1969 |
| | | Division of Ser. No. 602,853, Dec. 19, 1966, Patent No. 3,468,511. |
| [45] | Patented | Feb. 2, 1971 |
| [73] | Assignee | Robertshaw Controls Company |
| | | Richmond, Va. |
| | | a corporation of Delaware |

[54] ANTIHUNTING DIAPHRAGM VALVES
3 Claims, 14 Drawing Figs.

[52] U.S. Cl. .................................................. 137/489,
251/61.1, 251/45
[51] Int. Cl. ............................................................ F16k 7/17
[50] Field of Search............................................ 251/61.1,
331, 175, 120, 333, 45, 46; 137/510, 509, 625.3, 489

[56] References Cited
UNITED STATES PATENTS

| 1,986,475 | 1/1935 | Hewitt............................ | 251/331X |
| 2,683,464 | 7/1954 | St. Clair........................ | 251/175 |
| 3,307,633 | 3/1967 | Newall .......................... | 251/175X |

*Primary Examiner*—Arnold Rosenthal
*Attorneys*—Auzville Jackson, Jr., Robert L. Marben and Anthony A. O'Brien ABSTRACT: A diaphragm-type valve member for a pressure regulator movable relative to a fixed valve seat for regulating the pressure of a fluid flow therethrough in order to maintain delivery of the fluid flow at a constant pressure. A central portion of the valve member is integrally formed with the diaphragm to define an internal cavity under its seating contact portion to stabilize the movement of the diaphragm valve element and eliminate hunting or oscillation thereof at low pressure ranges.

INVENTOR
LAUREN D. HASKINS

Anthony A. O'Brien
ATTORNEY

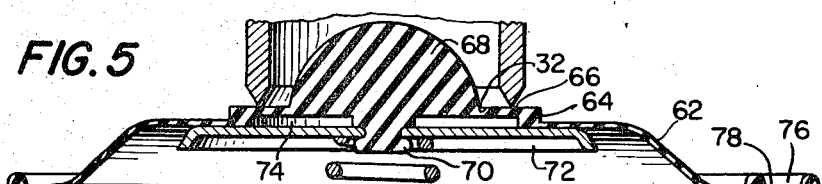
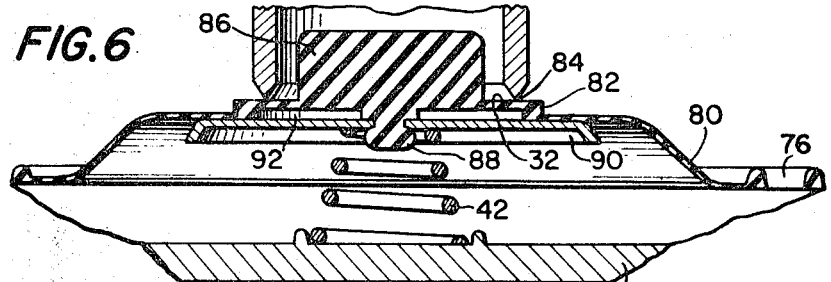
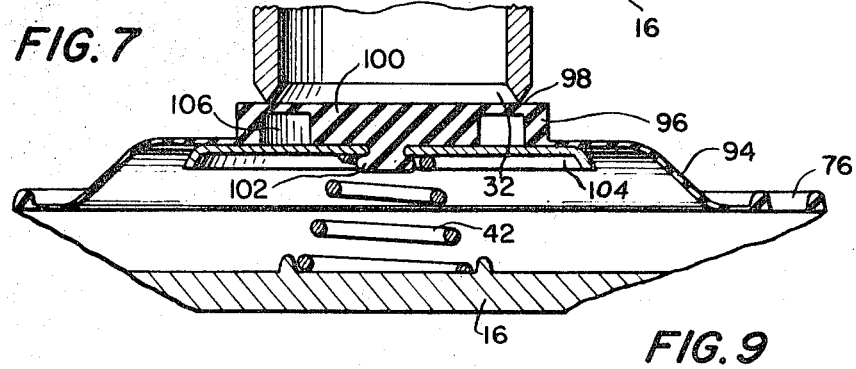
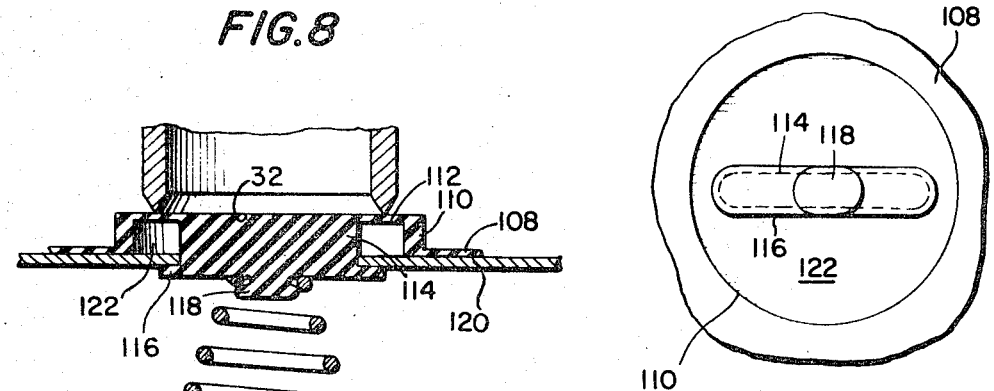
INVENTOR
LAUREN D. HASKINS
Anthony H. O'Brien
ATTORNEY

INVENTOR
LAUREN D. HASKINS

ATTORNEY

ANTIHUNTING DIAPHRAGM VALVES

CROSS REFERENCE TO RELATED APPLICATION

This application is a division of application Ser. No. 602,853, filed Dec. 19, 1966 (now U.S. Pat. No. 3,468,511).

This invention relates generally to flexible diaphragm valves for regulating main gas pressure at a steady outlet pressure over a wide range of inlet pressures and flow rates, and more particularly to antihunting diaphragm valves that enable the desired regulation even at low flow conditions.

Conventional diaphragm valves have been ineffective in securing main gas pressure regulation at a steady outlet pressure under low flow conditions. Such operational limitation is due to a tendency of the flexible valve to hunt, or oscillate, between two positions as the valve face approaches the valve seat. In one position, the valve face is forced into closing engagement with the valve seat by sucking force caused by the velocity of the gas traveling across the valve seat. This sudden closing engagement decreases the outlet pressure below desired level and the resultant fluid feedback signal from the outlet passageway then forces the valve face a disproportionate distance away from the valve seat to a second position. With the valve face in its second, or open position, the outlet pressure will be increased above the desired level, whereupon this cycle of movement is repeated. Such movement causes wide fluctuations in the outlet pressure levels, and stable effective regulation of the main gas pressure at low flow conditions is lost.

Accordingly, it is an object of this invention to overcome the above noted hunting tendency of diaphragm valves, and thereby extend the range of stabilized pressure regulation to previously uncontrollable low flow conditions.

It is another object of this invention to provide diaphragm valves that are so constructed and arranged as to counterbalance the opposing forces acting upon the valve face.

Another object is to increase the versatility of the diaphragm valve so that such valve can be employed on modulating controls of large capacity wherein modulation at low flow conditions is required.

An additional object is to prevent main gas leakage past the valve seat when the valve is fully seated.

A further object is to design a relatively inexpensive valve having a substantial area for contact with the valve seat so that errors in the concentricity of the valve face will not affect pressure regulation.

In practicing the present invention, an integrally formed diaphragm valve is constructed for securing gas pressure regulation, such valve having a flexible body, an upwardly extending annular wall centrally located upon said body, a valve face extending inwardly from said wall in a plane parallel to said body, the valve face being adapted to contact an annular valve seat along a circumferential path located radially inward of the annular wall, the valve face being relieved on its underside to increase its resiliency, and means situated radially inwardly of the circumferential path of contact for counterbalancing the increased resiliency of the valve face. The means on the valve body for counterbalancing the resiliency of the valve face may assume a number of configurations, such as central rib formations, internal cavities, and combinations of the rib and cavity arrangements.

Other objects and advantages of this invention will become apparent from the following description when taken in connection with the accompanying drawings wherein:

FIG. 5 is an enlarged, fragmentary vertical cross section through the valve seat and a first modification of the diaphragm valve, such valve being in a fully closed position;

FIG. 6 is a view similar to FIG. 5 but showing a second modification of the valve;

FIG. 7 is a view similar to FIG. 5 but showing a third modification of the valve;

FIG. 8 is a view similar to FIG. 5 but showing a fourth modification of the diaphragm valve;

FIG. 9 is a plan view of the underside of the valve of FIG. 8 with the washer pan removed;

Figure 1:
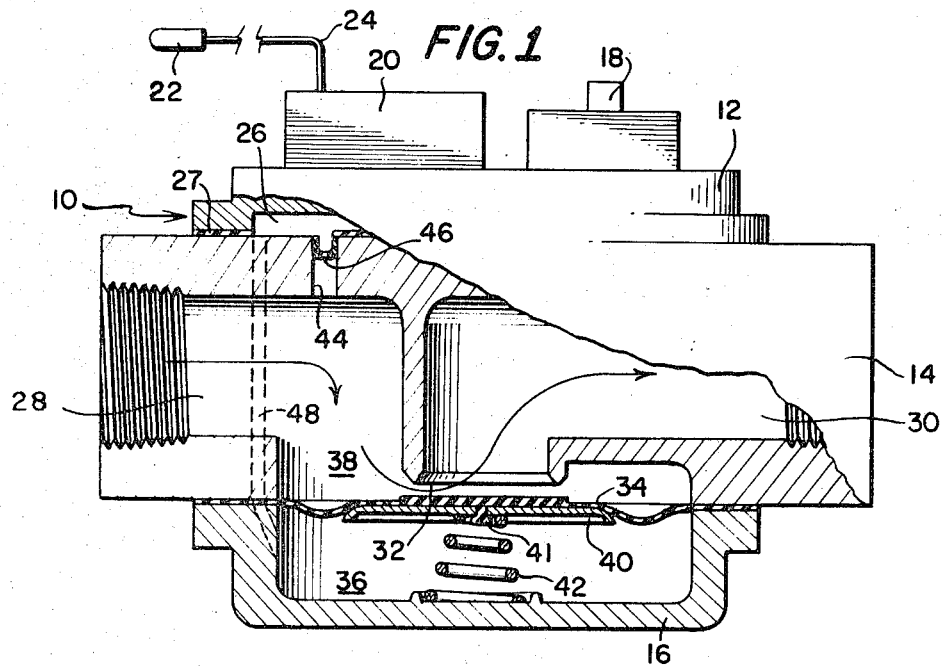
FIG. 1 is a front elevation of a pressure regulator with a portion of the casing cut away to show a valve seat and a main diaphragm valve of conventional design operatively associated therewith under normal flow conditions.

Referring now to the drawings, FIG. 1 shows a pressure regulator 10 having an upper section 12, a central section 14, and a lower section 16. Section 12 includes a bleed pressure regulator 18 and an on-off actuator 20, both of these components being of conventional design and hence being represented schematically in FIG. 1. Actuator 20, which may be a valve or a thermally actuated switch, is operated in response to conditions sensed by thermal bulb 22 and communicated to the actuator by capillary tubing 24. A bleed chamber 26 is situated in the interior of section 12 and a layer of gasketing material 27 is placed between sections 12 and 14 to create a fluid-tight seal.

Section 14 includes an inlet passage 28 and an outlet passage 30 that are separated by an annular valve seat 32. A flexible diaphragm 34 of conventional design cooperates with seat 32 to control the flow therethrough. The periphery of valve 34 is clamped between sections 14 and 16 during the assembly of regulator 10. The central part of the diaphragm encloses an upwardly opening cavity in section 16 to create an operating chamber 36 on its underside. The central part of the diaphragm also separates chamber 36 from inlet pressure chamber 38 created within section 14 on its opposite side.

Inlet chamber 38 communicates with inlet passage 28 so that the upper surface of the diaphragm valve is subjected to inlet pressure. A washer pan 40 is secured to the underside of diaphragm 34 by forcing the pan onto depending nose 41. A coil spring 42 is mounted in compression between the bottom wall of the cavity in section 16 and the pan whereby valve 34 is biased toward valve seat 32.

Regulator 10 has an internal bleed line arrangement including an inlet bleed passage 44 which communicates with main flow inlet passage 28 and which leads to the bleed chamber 26 having divergent bleed passages leading therefrom. A flow restrictor 46 with a small orifice therein is disposed in passage 44 to cause a pressure drop in the bleed flow. One divergent passage 48 leads from chamber 26 to operating chamber 36, and another passage (not shown) leads from chamber 26 through on-off actuator 20 and bleed pressure regulator 18 and thence through an outlet pressure sensing port to outlet passage 30 to establish communication therebetween.

In order to appreciate the significance of the novel diaphragm valve configurations described subsequently, it is first necessary to briefly describe the sequence of operation of regulator 10 employing diaphragm valve 34 of conventional design. Particular emphasis is placed upon regulator operation at low flow rate conditions.

Inlet bleed passage 44 in regulator 10 provides an internal bleed line for controlling the operation of main diaphragm valve 34 which, in turn, controls the flow of gas from a source (not shown) through outlet passage 30 to a suitable burner (not shown) for heating purposes. When the heating requirements in the space being heated are satisfied, on-off actuator 20 will be moved to its closed position to shutoff the downstream extension of chamber 26 in response to the expansion of the medium, such as mercury, retained in sensing bulb 22 and capillary tubing 24. A bleed flow of gas therefor will trace a static path from inlet passage 28 through inlet bleed passage 44, restrictor 46, chamber 26 and passage 48 into operating chamber 36. Since both sides of diaphragm 34 are subject to inlet pressure, spring 42 will bias the diaphragm against valve seat 32 so that the flow of gas through regulator 10 is cut off.

When there is a demand for heat sensed by the contraction of the medium within bulb 22 and tubing 24, actuator 20 will be moved to its open position to establish communication between chamber 26 and bleed flow pressure regulator 18 through bleed flow conduits in sections 12 and 14. Since pressure regulator 18 senses outlet pressure in outlet passage 30, it remains open causing pressure in operating chamber 36 to drop below the pressure in inlet chamber 38. Diaphragm valve 34 then moves to an open position due to the low pressure in chamber 36. When this valve opening causes the pressure in the outlet passage to rise to the set point of pressure regulator 18, the regulator partially closes and prevents the pressure in chamber 36 from lowering further. This controls the position of main valve 34 and regulates the pressure in outlet passage 30. Such open position is seen in FIG. 1 wherein the valve is moved downwardly away from seat 32 under normal, relatively high flow rate conditions.

However, when the input flow rate through passage 28 is reduced to a relatively low level in response to a decreased demand for heat, the pressure differential between chambers 36 and 38 is decreased and valve 34 will be biased by spring 42 toward seat 32. As the valve face of diaphragm 34 approaches valve seat 32, the diaphragm starts to hunt or oscillate between two extreme positions and thus cause surging of the outlet pressure in passage 30.

At one extreme position in the hunting movement, spring 42 will force valve 34 into contact with seat 32 despite the pressure of gas at low flow rates within passage 28. This sudden closing of valve 34 is due, at least in part, to the velocity effect created by the high speed flow of gas across the valve seat which produces a suction force tending to close the valve against seat 32.

The sudden closing of valve 34 causes the outlet pressure to drop to zero. This zero pressure is sensed by regulator 18 and it opens wide open allowing the pressure in chamber 36 to drop, causing valve 34 to open. While valve 34 is opening, the outlet pressure in passage 30 builds up and moves regulator 18 into its regulating position. There is a slight time delay, however, between the movement of regulator 18 and the diaphragm valve 34, therefore valve 34 overshoots and opens slightly too much during the time that regulator 18 is closing. This causes an excessive pressure in outlet passage 30, regulator 18 closes further, and the pressure in chamber 36 builds up moving valve 34 towards the closed position. Again valve 34 overshoots and since this is a low flow condition it is very close to the seat and a slight overshoot completely closes valve 34 and the outlet pressure again drops to zero. This process of movement is then cyclically repeated so that the outlet pressure in passageway 30 fluctuates over a wide range of pressure and effective pressure regulation is lost at low flow conditions.

Figure 2:
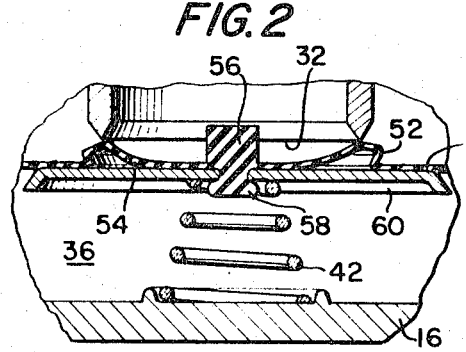
FIG. 2 is an enlarged, fragmentary vertical cross section through the valve seat of the regulator showing a diaphragm valve embodying the principles of this invention operatively associated therewith, such view being taken at low flow conditions.

FIG. 2 shows a diaphragm valve 50 of a unique design capable of eliminating the above described hunting tendency at low flow conditions, when such valve is substituted for valve 34 within regulator 10. Since regulator 10, per se, is not modified, only a fragmentary view of the valve seat 32 and diaphragm valve 50 are illustrated. Wherever feasible in the drawings, like numerals have been employed to identify identical elements. Additionally, it is noted that the sundry valves described hereinafter are all integrally formed members of silicone rubber or like flexible material.

Diaphragm valve 50 has an upwardly extending wall 52 that joins valve face 54 to the valve body, the undersurface of which defines a downwardly extending cavity. Face 54 is circular in shape when viewed from above, and has a diameter greater than seat 32. A rib or boss 56 extends above face 54 and is situated along the diameter of a circle which represents the path of contact between face 54 and seat 32 when the valve is fully closed. Rib 56 is somewhat shorter in length than the diameter of such circle, and is rectangular in configuration when viewed from the front of regulator 10. A nose 58 depends from the underside of the valve face to a point below the horizontal extent of the body of valve 50. A washer pan is pressed into position on a reduced section of nose 58 and extends radially outwardly beyond the valve face. Rib 56 imparts a limited degree of rigidity to face 54 to partially offset the flexibility attributable to the relieved section of the valve face. Such rigidity is most pronounced at those portions of face 54 closest to rib 56, and gradually diminishes until reaching those portions of face 54 which are located at right angles to the rib.

Figure 3:
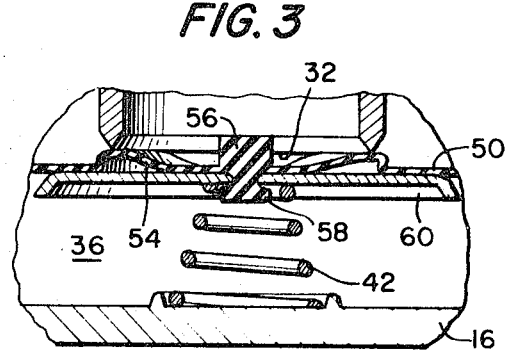
FIG. 3 is a view similar to FIG. 2 but showing the valve in an intermediate position approaching the valve seat.
Figure 4:
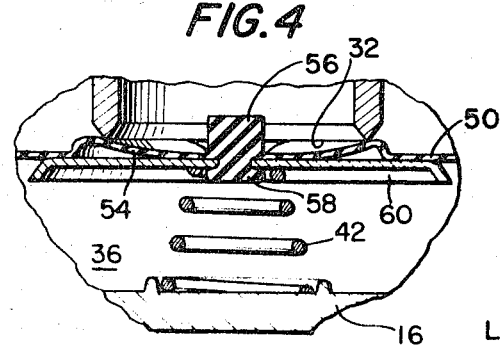
FIG. 4 is a view similar to FIG. 2 but showing the valve in an almost fully closed position.

FIGS. 2–4 illustrate the sequence of progressive flexing movements that face 54 undergoes as it approaches valve seat 32 under low flow conditions. As spring 42 biases the valve upwardly and as the above noted velocity effect tends to suck face 54 against seat 32, the most flexible points on the valve face located at right angles to diametral rib 56 will make the initial contact with the seat. This initial contact is best seen in FIG. 2.

As valve face 54 continues to approach seat 32 to further reduce the outlet flow rate in response to reduced flow requirements, those portions of face 54 between the points of initial contact and the horizontal axis of rib 56 progressively roll onto valve seat 32. FIG. 3 shows this increasing engagement of face 54 at an intermediate time interval in this process.

FIG. 4 illustrates the position of valve face 54 at a time interval subsequent to the position of FIG. 3 and just prior to the completion of the seating process. The progressive rolling contact between the valve face and the valve seat has almost been completed, and no hunting is encountered. When fully seated in a closed position, rib 56 will extend a short distance above the horizontal plane of face 54 into the mouth of passage 30 and no leakage will occur past the valve seat.

The reason diaphragm 50 eliminates hunting at low flows is that at low flows it is much less sensitive to overshoot than a normal rigid valve. At low flows using a rigid face, the entire valve face might be only .001 " from the seat and any overshoot of valve 34 would close the valve and start the hunting process. Using diaphragm 50 at low flows most of the valve face is in contact with the seat and the sections of the face at each end of rib 58 which are not in contact with the seat are at low flows much farther from the seat than the solid face diaphragm shown in FIG. 1. Therefore, an overshoot of a small amount, such as .001", will not completely close the valve and start hunting. Accordingly, valve 50 successfully overcomes the hunting tendency and effective pressure regulation at low flow conditions is achieved.

FIG. 5 shows a first alternative embodiment of the diaphragm valve, indicated generally be reference character 62, in a fully closed position with no flow occuring past the valve seat. A thickened, annular wall 64 extends upwardly from the valve body and a planar member extends horizontally therefrom to serve as a valve face 66. A diametral rib 68, which is hemispherical in cross section, extends above member 66 into the mouth of the outlet passage. A depending nose 70 extends below wall 64 so that a pan 72 can be pressed onto a reduced diameter section of this member and extend radially outwardly beyond the valve face. Face 66 is relieved between wall 64 and depending nose 70 by a downwardly opening cavity 74 to increase its flexibility. An ear 76 with an aperture is located at one point on the circumference of the body of valve 62, so that such valve can be readily aligned with internal bleed conduits within the regulator. A description of the operation of valve 62 is omitted since this valve functions in the same manner as valve 50 seen in FIGS. 2—4.

Another modified diaphragm valve, indicated generally by a numeral 80, is seen in a fully closed position in FIG. 6. Valve 80 has a centrally located annular wall portion 82 and a planar surface extends horizontally therefrom to serve as a valve face 84. A diametral rib 86, which is rectangular in cross section, extends above surface 84 into the mouth of the outlet passage. A depending nose 88 extends below wall 82 so that a pan 90 can be pressed onto a reduced diameter section of the nose. Face 84 is relieved between wall portion 82 and depending nose 88 by a downwardly opening cavity 92 which increases the flexibility of the valve face. Valve 80 is progressively seated on seat 32 and forms a variable area valve opening in the manner previously described in detail with reference to valve 50 and FIGS. 2—4.

Yet another alternative embodiment of an antihunting diaphragm valve, indicated generally by numeral 94, is illustrated in FIG. 7. Valve 94 has a centrally located, thickened annular wall 96 that connects the valve body to a planar surface which serves as a valve face 98. In contrast to the upwardly extending diametral ribs employed in the valve of FIGS. 2, 5 and 6, diametral rib 100 extends downwardly from the valve face and merges into depending nose 102 which retains washer pan 104 in position. The resiliency necessary to enable the progressive seating of valve face 98 is provided between wall 96 and face 98 by a downwardly opening cavity 106.

FIG. 8 is a fragmentary vertical cross-sectional view of another alternative embodiment of an antihunting diaphragm valve, indicated generally by numeral 108, that utilizes a downwardly extending diametral rib. Valve 108 has a centrally located, thickened annular wall 110 that joins the valve body to planar surface 112, which serves as a valve face. Diametral rib 114 extends downwardly from the valve face to a point below the horizontal level of the body of valve 108 and then merges into a lowermost section 116 of increased dimensions. Section 116, in turn, merges into a depending nose 118. In contrast to the previously described embodiments wherein the washer pan is pressed onto the nose, pan 120 is pressed onto rib 114 in such a manner as to rest atop section 116 and extending horizontally below, and parallel to, the valve body. A cavity 122 is thus formed between wall 110 and washer pan 120 to relieve valve face 112.

The configuration of the cavity 122 is best seen in FIG. 9, which is a horizontal view of the underside of face 112 with the pan 120 removed. This cavity has the same general outline as the relieving cavities of the embodiments of FIGS. 2, 5, 6 and 7, which also extend inwardly from the annular wall to the outline of a central depending member, such as a nose or a rib.

Figure 10:
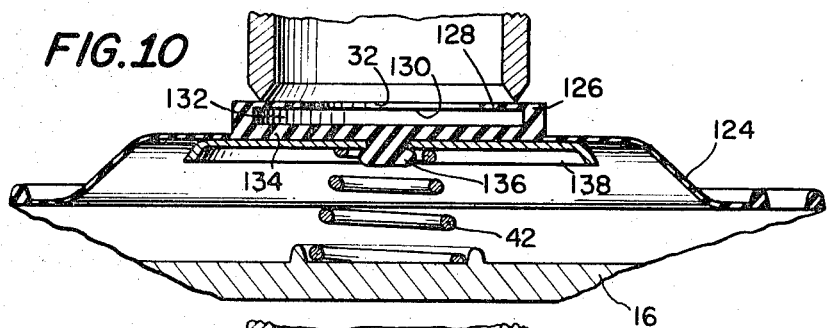
FIG. 10 is a view similar to FIG. 5 but showing a fifth modification of the valve.

Another basic variety of antihunting diaphragm valve, indicated generally by numeral 124, is depicted in FIG. 10 in a fully closed position. Valve 124 employs a raised valve face with an internal cavity extending radially inwardly of the circular path of contact between valve seat 32 and the valve face in place of the sundry diametral rib configurations seen in FIGS. 2, 5, 6, and 7 and 8. Such internal cavity configuration counterbalances the opposing forces acting upon the valve face at low flow conditions, however, in an analogous manner.

Valve 124 has a centrally located valve face with a thickened annular wall 126 and a planar member joined to the wall, such member serving as a valve face 128. A centrally located circular aperture extends through face 128 radially inwardly of the circular path of contact between the valve seat and face and enables internal cavity 132 to establish communication with the pressure forces acting upon face 128. Cavity 132 is defined in its length dimension by wall 126 and is defined in its height dimension by the distance between thickened base 134 and face 128. Nose 136 depends from the base and washer pan 138 is snapped into position on a reduced section of the nose.

Cavity 132 relieves face 128 and increases its flexibility, so that the face functions as a cantilever beam. Such cavity with its central aperture 130 overcomes the hunting tendency normally exhibited by these valves by counterbalancing the opposing forces acting upon the valve face at low flow conditions.

An upwardly directed suction force is exerted upon face 128 and tends to draw the face into sealing engagement with seat 32. This suction force is created by the rapid passing of the main gas across valve seat 32. A downwardly pressing force, which tends to press the valve face away from its seat, is exerted on that portion of valve face 128 extending radially outwardly from the circular path of engagement of the seat on the face. This pressing force is due to the pressure differential existing between the relatively high inlet pressure (e.g., 5—20 p.s.i.g.) and the relatively low outlet pressure in passage 30 (e.g., 3—3.7 p.s.i.g.). These forces oppose one another through their interaction upon the cantilevered valve face, and cavity 132 serves as insulating buffer to absorb any temporary imbalance in such forces which are manifested by a downward or upward flexing of face 128. Valve 124 is therefore primarily responsive to the pressure in the operating chamber of the pressure regulator 10, and stabilized pressure regulation is achieved at low flow conditions.

Figure 11:
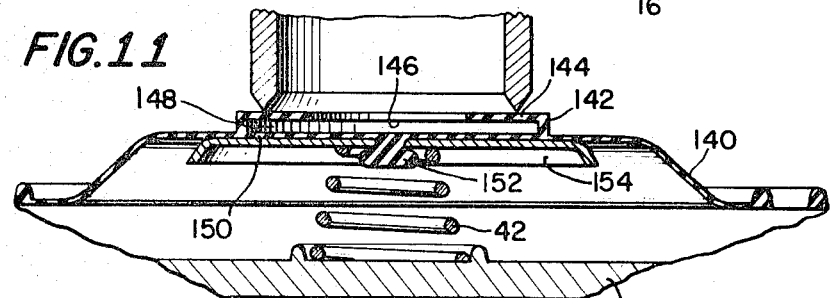
FIG. 11 is a view similar to FIG. 5 but showing a sixth modification of the valve.

FIG. 11 illustrates another embodiment of a diaphragm valve, indicated generally by numeral 140, that employs a valve face with an internal cavity. Valve 140 has a centrally located annular wall 142 and a planar member is joined to wall 142 and functions as a valve face 144. An aperture 146 extends through face 144 radially inwardly of the circular path of contact between the valve seat and face and enables internal cavity 148 to establish communication with the pressure forces acting on face 144.

Cavity 148 is defined in its length dimension by wall 142 and is defined in its height dimension by the distance between base 150 and the underside of face 144. Nose 152 depends downwardly from the base and washer pan 154 is snapped into position on a reduced diameter section of the nose. Since valve 140 operates in the same manner as valve 124, a discussion of the manner in which valve 140 overcomes the hunting tendency is deemed superfluous.

Figure 12:
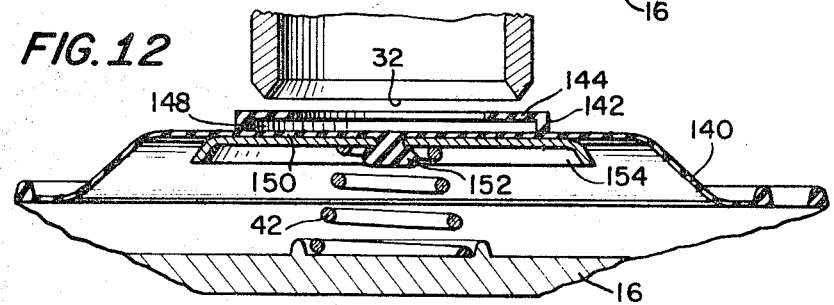
FIG. 12 is a view similar to FIG. 11 showing the valve approaching the valve seat at low flow conditions.

FIG. 12 shows valve 140 with valve face 144 spaced a slight distance below valve seat 32 to permit main gas to flow therethrough. This position represents a low flow rate condition, whereas FIG. 11 represents a fully closed, no flow condition. In place of the initial contact at two points and subsequent rolling engagement with seat 32 seen in FIGS. 2—4, valve face 144 continuously maintains a horizontal inclination as it approaches the seat, for a dynamic equilibrium of the forces acting upon the face is constantly attained through the buffering interaction of the internal cavity.

Figure 13:
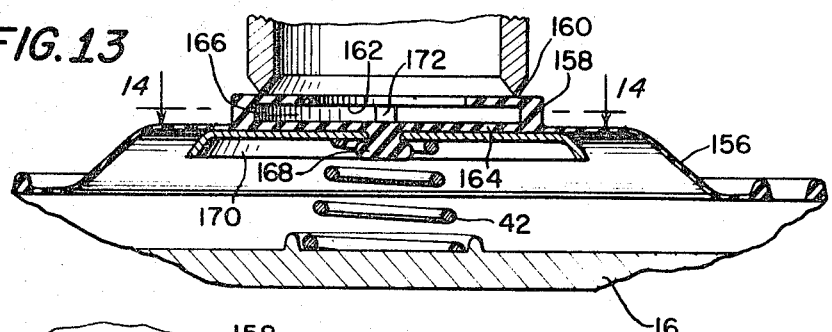
FIG. 13 is a view similar to FIG. 5 showing a seventh modification of the valve.
Figure 14:
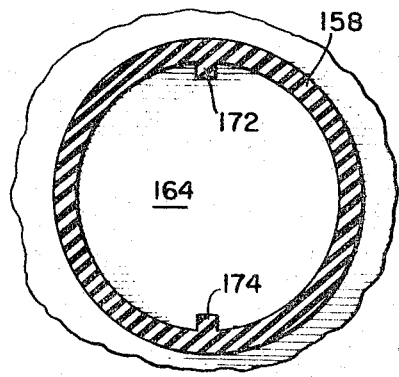
FIG. 14 is a horizontal cross section through the valve of FIG. 13, such view being taken along line 14–14 in FIG. 13.

The two basic varieties of antihunting diaphragm valves, i.e., the diametral rib configurations of FIGS. 2, 5, 6, 7 and 8 and the internal cavity configurations of FIGS. 10 and 11, are united in the diaphragm valve shown in FIGS. 13 and 14 and identified by numeral 156. Valve 156 has a raised central portion consisting of a thickened annular wall 158, a flexible valve face 160 with an aperture 162 formed therein and a base member 164. Wall 158, base 164, and face 160 form an internal cavity 166 within valve 156. A nose 168 depends from base member 164 and washer pan 170 is seated on the nose.

As best seen in FIG. 14, which view is taken just below face 160, a pair of diametrically opposed nubs 172 and 174 are integrally formed with wall 158. These nubs are situated outboard of the circular path of contact between face 160 and seat 32. Because of the slightly increased rigidity imparted to face 160 by nubs 172 and 174, face 160 will make initial contact with seat 32 at the points at right angles to a diametral line connecting these nubs in much the same manner that diaphragm valve 50 contacts the valve seat in FIG. 2. Cantilevered valve face 160 will then gradually seat itself upon seat 32 in response to lower flow requirements by combining the progressive rolling engagement seen in FIGS. 2—4 with the pressure buffering effect of the internal cavity in the valve seen in FIGS. 11 and 12.

Inasmuch as the above described antihunting diaphragm valves are subject to further modification, variation and changes in detail, it is intended that all matter contained in the foregoing description or shown on the accompanying drawings shall be interpreted as illustrative and not a limiting sense.

I claim:

1. A pressure regulator comprising:

a valve casing having inlet and outlet means and flow passage means therebetween, an annular valve seat in said casing separating said flow passage means into upstream and downstream portions communicating with said inlet and outlet means, respectively, pressure responsive valve means operatively disposed in said upstream portion, said pressure responsive valve means including a flexible diaphragm having a periphery fixedly mounted in said casing and having an imperforate central portion, an integrally formed annular wall disposed on the central portion of said diaphragm, said annular wall extending substantially transversely from said central portion toward said annular valve seat and having a terminal portion with a diameter greater than that of said annular valve seat, an integrally formed circular valve face extending radially inwardly from the terminal portion of said annular wall and cooperating therewith and with said central portion to define an internal cavity enhancing resilient characteristics of said circular valve face for proper cooperation with said annular valve seat, means defining an opening for said internal cavity including a central aperture in said circular valve face and with a diameter lesser than that of said annular valve seat, said opening establishing communication between said internal cavity and said downstream portion when said circular valve face is closed on said annular valve seat, and said opening establishing communication between said internal cavity and said upstream portion when said circular valve face is displaced from said annular valve seat whereby opposite surfaces of said circular valve face is exposed to pressure of fluid flow in said upstream portion.

2. The invention as defined in claim 1 wherein means increasing the rigidity of said circular valve face comprises a pair of nubs situated within said internal cavity on diametrically opposite sides of said annular wall.

3. The invention as defined in claim 2 wherein said nubs terminate radially outwardly of the circular path of contact between the valve face and valve seat.